United States Patent
Ibrahim et al.

(10) Patent No.: US 11,485,684 B2
(45) Date of Patent: Nov. 1, 2022

(54) WATER CURED CONCRETE MIX COMPOSITION

(71) Applicant: KING FAHD UNIVERSITY OF PETROLEUM AND MINERALS, Dhahran (SA)

(72) Inventors: Mohammed Ibrahim, Dhahran (SA); Mohammed Salihu Barry, Dhahran (SA); Mohammed Maslehuddin, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 20 days.

(21) Appl. No.: 16/168,312

(22) Filed: Oct. 23, 2018

(65) Prior Publication Data

US 2019/0055164 A1    Feb. 21, 2019

Related U.S. Application Data

(62) Division of application No. 15/195,092, filed on Jun. 28, 2016, now Pat. No. 10,150,703.

(51) Int. Cl.
*C04B 7/34* (2006.01)
*C04B 28/04* (2006.01)
(Continued)

(52) U.S. Cl.
CPC .............. *C04B 28/04* (2013.01); *C04B 28/32* (2013.01); *B01J 2219/025* (2013.01);
(Continued)

(58) Field of Classification Search
USPC ........................................ 106/638, 713, 737
See application file for complete search history.

(56) References Cited

U.S. PATENT DOCUMENTS

2014/0299023 A1    10/2014  Guynn et al.
2015/0069664 A1    3/2015   Ciuperca
(Continued)

FOREIGN PATENT DOCUMENTS

KR    10-1308388 B1    9/2013
KR    10-1382751 B1    4/2014
(Continued)

OTHER PUBLICATIONS

Suprenant, "Adjusting Slump in the Field," (Year: 1994).*
(Continued)

*Primary Examiner* — James E McDonough
(74) *Attorney, Agent, or Firm* — Oblon, McClelland, Maier & Neustadt, L.L.P.

(57) ABSTRACT

A cementitious blend composition and a concrete mix composition preferable for making concrete resistant to high temperatures and alkaline conditions, particularly for making durable concrete for constructing an alumina digester tank in an aluminum smelter. The cementitious blend composition includes at least one hydraulic cement, silica fume (SF), and natural pozzolan (NP), wherein a weight percent ratio of at least one hydraulic cement:SF:NP in the cementitious blend composition lies in the range of (24-63):(5-44):(32-40) with the sum of the weight percentages of the at least one hydraulic cement, the SF, and the NP not exceeding 100%. The concrete mix composition comprises water and the cementitious blend composition, wherein a weight ratio of the water to the cementitious blend composition is 0.2-0.5, and wherein the concrete mix composition has a content of the cementitious blend composition of 400-550 kg/m$^3$.

7 Claims, 9 Drawing Sheets

(51) Int. Cl.
   *C04B 28/32* (2006.01)
   *C04B 7/00* (2006.01)
   *C04B 28/00* (2006.01)
   *C04B 9/12* (2006.01)
   *C04B 32/00* (2006.01)
   *C04B 111/20* (2006.01)
   *C04B 111/28* (2006.01)
   *C04B 111/80* (2006.01)
   *C04B 103/00* (2006.01)
   *C04B 103/30* (2006.01)

(52) U.S. Cl.
   CPC ............... *B01J 2219/0245* (2013.01); *B01J 2219/0263* (2013.01); *C04B 2103/0088* (2013.01); *C04B 2103/302* (2013.01); *C04B 2111/20* (2013.01); *C04B 2111/28* (2013.01); *C04B 2111/802* (2013.01); *Y02W 30/91* (2015.05)

(56) References Cited

U.S. PATENT DOCUMENTS

2015/0152006 A1 6/2015 Guzzetta et al.
2015/0232381 A1 8/2015 Niven et al.

FOREIGN PATENT DOCUMENTS

| RU | 2008 132 977 A | | 2/2010 | |
| RU | 2008132977 A | * | 2/2010 | ............ C04B 14/02 |
| WO | WO-2012091688 A1 | * | 7/2012 | ............ C04B 14/06 |
| WO | WO 2012/151657 A1 | | 11/2012 | |

OTHER PUBLICATIONS

R. P. Khatri, et al., "Effect of different supplementary cementitious materials on mechanical properties of high performance concrete", Cement and Concrete Research, vol. 25, Issue 1, Jan. 1995, pp. 209-220 (Abstract only).

B.W. Langan, et al., "Effect of silica fume and fly ash on heat of hydration of Portland cement", Cement and Concrete Research, vol. 32, Issue 7, Jul. 2002, pp. 1045-1051.

M.J. Shannag, "High strength concrete containing natural pozzolan and silica fume", Cement and Concrete Composites, vol. 22, issue 6, Dec. 2000, pp. 399-406.

* cited by examiner

WATER CURED CONCRETE MIX COMPOSITION

CROSS-REFERENCE TO RELATED APPLICATIONS

The present application is a Divisional application of Ser. No. 15/195,092, now allowed, having a filing date of Jun. 28, 2016.

BACKGROUND OF THE INVENTION

Technical Field

The present disclosure relates to cementitious blend and concrete mix compositions resistant to high temperatures and alkaline conditions, particularly for making durable concrete for constructing an alumina digester tank resistant to a hot caustic soda solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

In North American practice, high strength concrete is usually considered to be concrete with a 28-day compressive strength of at least 42 MPa. Compared with conventional concrete, high strength concrete is more durable because of reduced porosity, inhomogeneniety, and microcracks.

It is an object of the present disclosure to provide cementitious blend and concrete mix compositions for making high strength, durable concrete resistant to high temperatures and alkaline conditions that is, for example, suited for constructing an alumina digester tank in an aluminum smelter. Preferred embodiments of the cementitious blend and concrete mix compositions use both hydraulic cements and supplementary cementitious materials, such as silica fume (SF), ground granulated blast furnace slag (GGBFS), and naturual pozzolan (NP). Since most of the supplementary cementitious materials are industrial by-products, the use of the supplementary cementitious materials in the inventive compositions helps reduce the amount of hydraulic cements required to make the resultant concrete less costly, more environmentally friendly, and less energy intensive.

BRIEF SUMMARY OF THE INVENTION

According to a first aspect, the present disclosure relates to a cementitious blend composition that includes at least one hydraulic cement, silica fume (SF), and natural pozzolan (NP), wherein a weight percent ratio of at least one hydraulic cement:SF:NP in the cementitious blend composition lies in the range of (24-63):(5-44):(32-40) with the sum of the weight percentages of the at least one hydraulic cement, the SF, and the NP not exceeding 100%.

In one or more embodiments, the at least one hydraulic cement is at least one selected from the group consisting of a Portland cement, a calcium aluminate cement, a white cement, a high-alumina cement, a magnesium silicate cement, a magnesium oxychloride cement, and an oil well cement.

In one or more embodiments, the natural pozzolan (NP) is at least one selected from the group consisting of metakaolin, calcined shale, calcined clay, volcanic glass, zeolitic trass or tuffs, rice husk ash, Diatomaceous earth, and calcined shale.

In one or more embodiments, the present disclosure relates to a concrete mix composition comprising water and the cementitious blend composition, wherein a weight ratio of the water to the cementitious blend composition is 0.2-0.5, and wherein the concrete mix composition has a content of the cementitious blend composition of 400-550 $kg/m^3$.

In one or more embodiments, the concrete mix composition further comprises at least one reinforcing material selected from the group consisting of steel rebar, wire mesh, steel fibers, polypropylene fibers, nylon fibers, and polyvinyl alcohol fibers.

In one or more embodiments, the concrete mix composition further comprises at least one high range water reducer.

In one or more embodiments, the at least one high range water reducer is a polycarboxylate superplasticizer or a naphthalene high range water reducer.

In one or more embodiments, the present disclosure relates to an alumina digester tank system that includes (a) an alumina digester tank obtained from a casting or molding of the concrete mix composition in the form of the alumina digester tank and water curing the cast or molded concrete mix composition, wherein the alumina digester tank has a height to diameter ratio of 1-5 and comprises a top wall, a bottom wall, and side walls defining an enclosed space, (b) at least one inlet disposed on at least one of the top wall, the bottom wall, and the side walls of the alumina digester tank configured to introduce a mixture comprising bauxite and a caustic soda solution into the enclosed space of the alumina digester tank, wherein the alumina digester tank is configured to pressurize the mixture in the enclosed space to 1-100 bars, (c) at least one heater disposed on the interior of at least one of the top wall, the bottom wall, and the side walls and/or in the enclosed space of the alumina digester tank configured to heat the mixture to a temperature of 60-300° C., (d) at least one outlet disposed on at least one of the top wall, the bottom wall, and the side walls configured to release the mixture from the enclosed space of the alumina digester tank, (e) at least one agitator disposed on the interior of at least one of the top wall, the bottom wall, and the side walls and/or in the enclosed space of the alumina digester tank configured to agitate the mixture in the enclosed space, (f) a temperature detector for detecting the temperature of the mixture in the enclosed space of the alumina digester tank, (g) a pressure detector for detecting the pressure applied to the mixture in the enclosed space of the alumina digester tank, and (h) a control for operating the at least one heater, wherein the control is configured to monitor the temperature of the mixture in the enclosed space of the alumina digester tank and operate the at least one heater when the temperature of the mixture is below a pre-determined level.

In one or more embodiments, the alumina digester tank system further comprises at least one first pump connected to the at least one inlet configured to pump the mixture into the enclosed space of the alumina digester tank via the at least one inlet, at least one second pump connected to the at least one outlet configured to pump the mixture out of the enclosed space of the alumina digester tank via the at least one outlet, and at least one baffle disposed on the interior of at least one of the top wall, the bottom wall, and the side walls and/or in the enclosed space of the alumina digester tank configured to achieve a desired flow pattern of the mixture in the enclosed space of the alumina digester tank.

In one or more embodiments, a surface of the interior of at least one of the top wall, the bottom wall, and the side walls of the alumina digester tank of the alumina digester tank system is coated with at least one epoxy resin.

In one or more embodiments, the at least one hydraulic cement of the concrete mix composition is a Portland cement.

In one or more embodiments, the at least one hydraulic cement of the concrete mix composition is a Portland cement, and the water cured product of the concrete mix composition has a compressive strength of 60-90 MPa.

In one or more embodiments, the at least one hydraulic cement of the concrete mix composition is a Portland cement, and the water cured product of the concrete mix composition has a reduction in compressive strength of 2-15% when exposed to an alkaline solution comprising 10-50% of one or more alkali hydroxides at 40-80° C. for 4-16 months as compared to the water cured product of the concrete mix composition exposed to water at 15-35° C. for the same length of time.

In one or more embodiments, the at least one hydraulic cement of the concrete mix composition is a Portland cement, and the water cured product of the concrete mix composition has a weight loss of 0-6% when exposed to an alkaline solution comprising 10-50% of one or more alkali hydroxides at 40-80° C. for 4-16 months as compared to the water cured product of the concrete mix composition exposed to water at 15-35° C. for the same length of time.

In one or more embodiments, the at least one hydraulic cement of the concrete mix composition is a Portland cement, and the water cured product of the concrete mix composition has a chloride permeability of 1200-2000 Coulombs when exposed to an alkaline solution comprising 10-50% of one or more alkali hydroxides at 40-80° C. for 12-16 months.

In one or more embodiments, the at least one hydraulic cement of the concrete mix composition is a Portland cement, and the water cured product of the concrete mix composition has an expansion of 200-850 microns when exposed to an alkaline solution comprising 10-50% of one or more alkali hydroxides at 40-80° C. for 4-16 months.

In one or more embodiments, the concrete mix composition further comprises at least one aggregate selected from the group consisting of fused aluminum oxide (FAO), calcined bauxite, and emery.

In one or more embodiments, the at least one aggregate comprises fused aluminum oxide (FAO) at 50-100% of the total volume of the at least one aggregate.

According to a second aspect, the present disclosure relates to an alumina digester tank system that includes (a) an alumina digester tank obtained from a casting or molding of a concrete mix composition in the form of the alumina digester tank and water curing the cast or molded concrete mix composition, wherein the alumina digester tank has a height to diameter ratio of 1-5 and comprises a top wall, a bottom wall, and side walls defining an enclosed space, wherein the concrete mix composition comprises: a cementitious blend comprising at least one hydraulic cement and ground granulated blast furnace slags (GGBFS), wherein a weight percent ratio of at least one hydraulic cement: GGBFS in the cementitious blend lies in the range of (10-50):(50-90) with the sum of the weight percentages of the at least one hydraulic cement and the GGBFS not exceeding 100%, and water, wherein a weight ratio of the water to the cementitious blend is 0.2-0.5, and wherein the concrete mix composition has a content of the cementitious blend of 400-550 kg/m$^3$, (b) at least one inlet disposed on at least one of the top wall, the bottom wall, and the side walls of the alumina digester tank configured to introduce a mixture comprising bauxite and a caustic soda solution into the enclosed space of the alumina digester tank, wherein the alumina digester tank is configured to pressurize the mixture in the enclosed space to 1-100 bars, (c) at least one heater disposed on the interior of at least one of the top wall, the bottom wall, and the side walls and/or in the enclosed space of the alumina digester tank configured to heat the mixture to a temperature of 60-300° C., (d) at least one outlet disposed on at least one of the top wall, the bottom wall, and the side walls of the alumina digester tank configured to release the mixture from the enclosed space of the alumina digester tank, (e) at least one agitator disposed on the interior of at least one of the top wall, the bottom wall, and the side walls and/or in the enclosed space of the alumina digester tank configured to agitate the mixture in the enclosed space, (f) a temperature detector for detecting the temperature of the mixture in the enclosed space of the alumina digester tank, (g) a pressure detector for detecting the pressure applied to the mixture in the enclosed space of the alumina digester tank, and (h) a control for operating the at least one heater, wherein the control is configured to monitor the temperature of the mixture in the enclosed space of the alumina digester tank and operate the at least one heater when the temperature of the mixture is below a pre-determined level.

In one or more embodiments, a surface of the interior of at least one of the top wall, the bottom wall, and the side walls of the alumina digester tank of the alumina digester tank system is coated with at least one epoxy resin.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
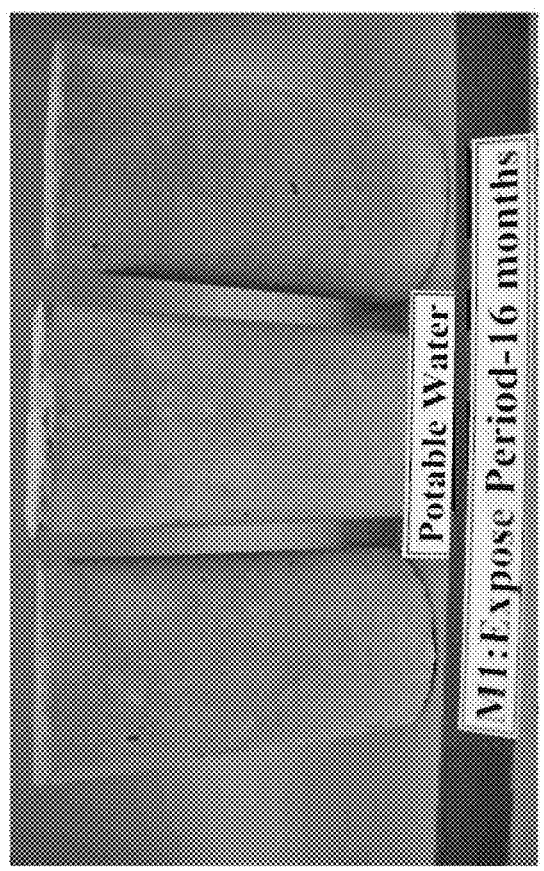
FIG. 1A is a picture showing the condition of concrete mix specimen M1 following an exposure to a caustic soda solution for 16 months according to Example 3.
Figure 1B:
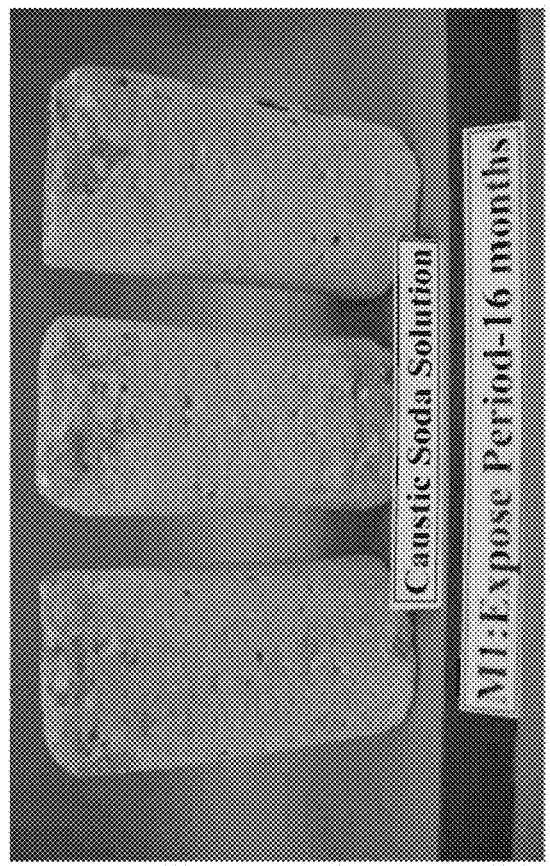
FIG. 1B is a picture showing the condition of concrete mix specimen M1 following an exposure to potable water for 16 months according to Example 3.
Figure 2A:
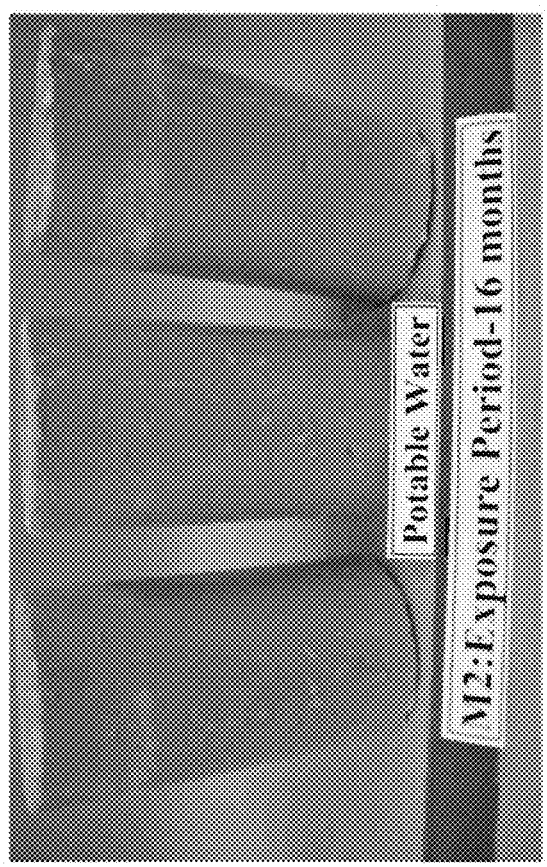
FIG. 2A is a picture showing the condition of concrete mix specimen M2 following an exposure to a caustic soda solution for 16 months according to Example 3.
Figure 2B:
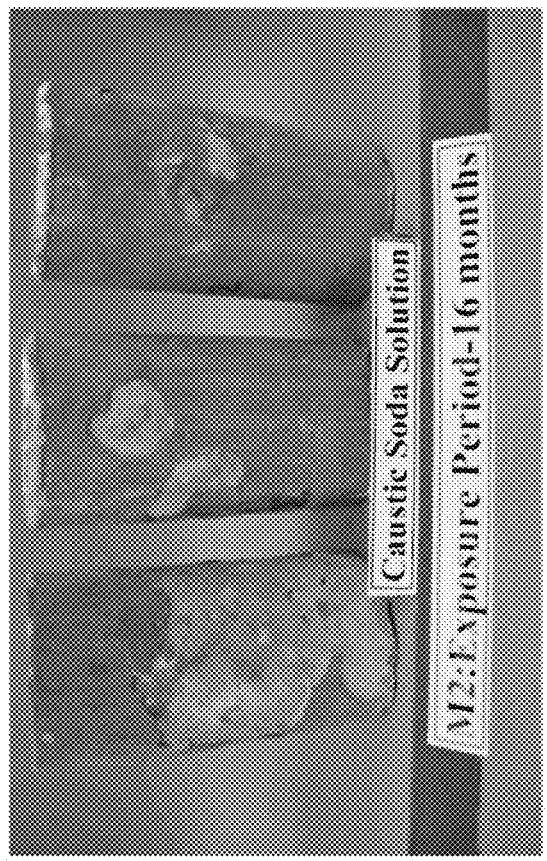
FIG. 2B is a picture showing the condition of concrete mix specimen M2 following an exposure to potable water for 16 months according to Example 3.
Figures 3A, 3B:
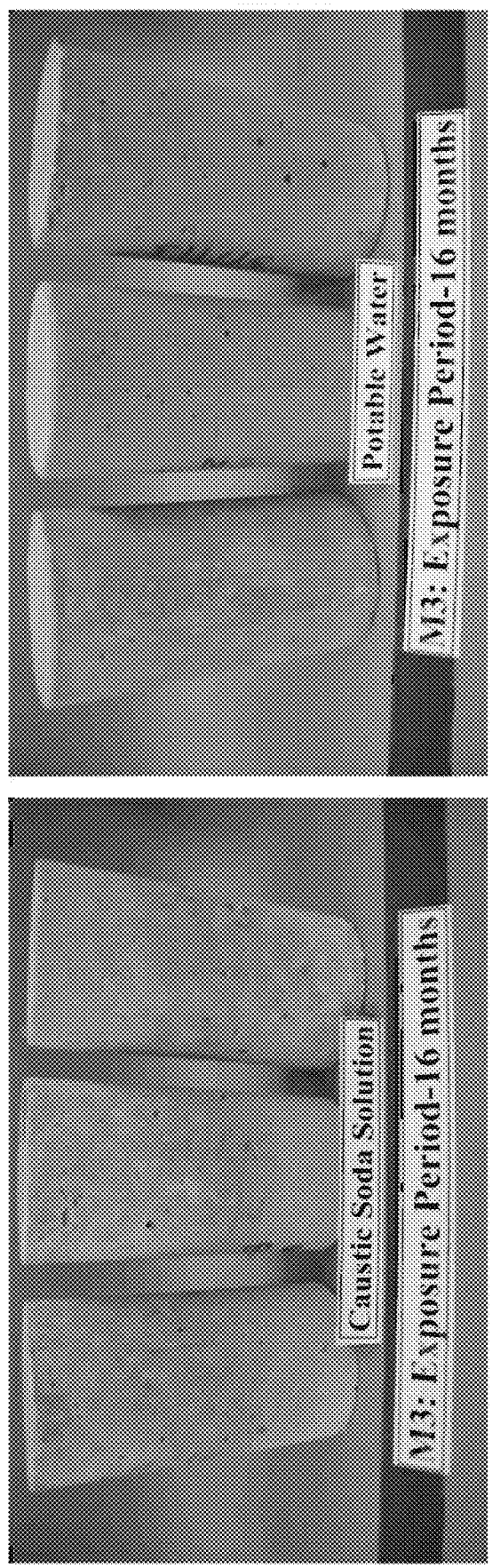
FIG. 3A is a picture showing the condition of concrete mix specimen M3 following an exposure to a caustic soda solution for 16 months according to Example 3.
FIG. 3B is a picture showing the condition of concrete mix specimen M3 following an exposure to potable water for 16 months according to Example 3.
Figure 4A:
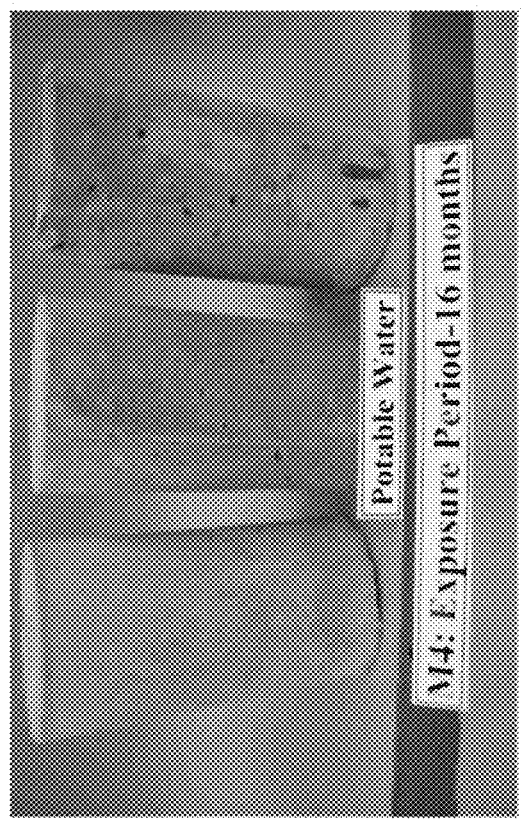
FIG. 4A is a picture showing the condition of concrete mix specimen M4 following an exposure to a caustic soda solution for 16 months according to Example 3.
Figure 4B:
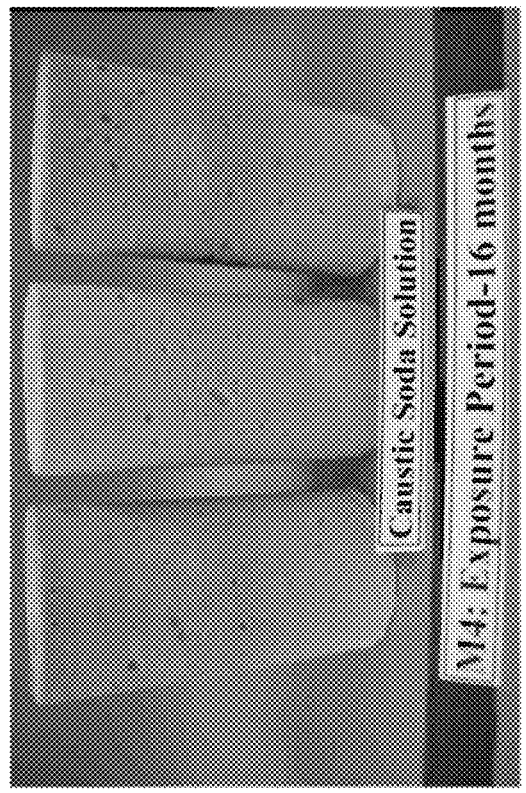
FIG. 4B is a picture showing the condition of concrete mix specimen M4 following an exposure to potable water for 16 months according to Example 3.

According to a first aspect, the present disclosure relates to a cementitious blend composition preferably for making concrete resistant to high temperatures, e.g. 60-300° C., 80-300° C., 100-300° C., 100-250° C., 120-200° C., or 150-180° C., and alkaline conditions, more preferably for making durable concrete for constructing an alumina digester tank in an aluminum smelter. The cementitious blend composition includes at least one hydraulic cement, silica fume (SF), and natural pozzolan (NP), wherein a weight percent ratio of at least one hydraulic cement:SF:NP in the cementitious blend composition lies in the range of (25-70):(5-20):(25-55), (24-63):(5-44):(32-40), or (30-55):(5-40):(30-40), with the sum of the weight percentages of the at least one hydraulic cement, the SF, and the NP not exceeding 100%.

In some embodiments, the cementitious blend composition does not include fly ash, or GGBFS, or a combination of fly ash and GGBFS.

In one embodiment, the cementitious blend composition is combined with water to obtain a concrete mix composition, wherein a weight ratio of the water to the cementitious blend composition is 0.2-0.5, 0.3-0.4, or 0.35, and wherein the concrete mix composition has a content of the cementitious blend composition of 400-550 kg/m, 400-500 kg/m, 405-480 kg/m³, 430-470 kg/m³, or 460 kg/m.

Hydraulic cements set and become adhesive due to a chemical reaction between the dry ingredients and water. The chemical reaction results in mineral hydrates that are not very water-soluble and so are quite durable in water and safe from chemical attack. This allows setting in wet conditions or underwater and further protects the hardened material from chemical attack.

In one embodiment, the hydraulic cement is a Portland cement. In a preferred embodiment, the Portland cement meets ASTM C150 Type I, II, I/II, III, IV or V requirements or equivalent standard specifications.

Portland cement is by far the most common type of cement in general use around the world. This cement is made by heating limestone (calcium carbonate) with other materials (such as clay) to 1450° C. in a kiln, in a process known as calcination, whereby a molecule of carbon dioxide is liberated from the calcium carbonate to form calcium oxide, or quicklime, which is then blended with the other materials that have been included in the mix to form calcium silicates and other cementitious compounds. The resulting hard substance, called 'clinker', is then ground with a small amount of gypsum into a powder to make "Ordinary Portland Cement", the most commonly used type of cement (often referred to as OPC). Portland cement is a basic ingredient of concrete, mortar and most non-specialty grout. The most common use for Portland cement is in the production of concrete. Concrete is a composite material typically comprising aggregate (gravel and sand), cement, and water. As a construction material, concrete can be cast in almost any shape desired, and once hardened, can become a structural (load bearing) element. Portland cement reacts with water to form primarily calcium silicate hydrate. The strength of the resultant concrete results from a hydration reaction between the silicate phases of Portland cement and water to form calcium silicate hydrate $Ca_3Si_2O_{11}H_8$ (3 $CaO.2$ $SiO_2.4H_2O$, or $C_3S_2H_4$ in Cement chemist notation (CCN)) and calcium hydroxide (lime) as a by-product.

In another embodiment, the hydraulic cement is a calcium aluminate cement that advantageously provides resistance to a high temperature, e.g. 900-1600° C., 1000-1500° C., or 1200-1300° C., depending on the particular concrete composition. Calcium aluminate cements are made primarily from limestone and bauxite. The active ingredients are monocalcium aluminate $CaAl_2O_4(CaO.Al_2O_3$ or "CA" in CCN) and mayenite $Ca_{12}Al_{14}O_{33}$ (12 $CaO.7$ $Al_2O_3$, or $C_{12}A_7$ in CCN). Strength of the resultant concrete results from hydration to calcium aluminate hydrates.

In another embodiment, the hydraulic cement is one or more cements selected from the group consisting of a Portland cement, a calcium aluminate cement, a white cement, a high-alumina cement, a magnesium silicate cement, a magnesium oxychloride cement, and an oil well cement (e.g., Type VI, VII and VIII). When the hydraulic cement is a mixture of the above mentioned cements, the relative weight proportions of different types of cements may vary without limitation, depending on, for example, the desired content of the cementitious blend composition in the concrete mix composition, which is preferably within the ranges described above, the desired compressive strength of the resultant concrete from the concrete mix composition after a certain period of curing of the concrete mix composition with water, and a target (high) temperature the resultant concrete is expected to withstand and remain stable, e.g. without breaking or cracking, for a desirable period of time.

Relative to the hydraulic cement, the silica fume and natural pozzollan in the cementitious blend composition are supplementary cementitious materials that advantageously reduce the costs of the cementitious blend composition and improve the durability and strength of the resultant concrete from the concrete mix composition comprising the cementitious blend composition, particularly in a hot and alkaline environment, such as that in an operating alumina digester tank containing a NaOH (caustic soda) solution at a temperature of 60-300° C., 80-300° C., 100-300° C., 100-250° C., 120-200° C., or 150-180° C. The silica fume and natural pozzolan react with calcium hydroxide, a by-product of Portland cement hydration to form additional binder conferring increased durability and strength. The concrete formed from a concrete mix composition comprising calcium aluminate cement, silica fume, and natural pozzolan likewise has increased durability and strength due to prevention or reduction of conversion (a change in the internal structure of the concrete).

Silica fume, also known as microsilica, is an amorphous (non-crystalline) polymorph of silicon dioxide, or silica. It is an ultrafine powder collected as a by-product of the silicon and ferrosilicon alloy production and comprises spherical particles with an average particle diameter of 100-1000 nm, 200-800 nm, 300-600 nm, or 400-500 nm. The main field of application of silica fume is as pozzolanic material for high performance concrete. Preferable standard specifications for silica fume used in the cementitious blend composition are ASTM C1240.

Pozzolans are a broad class of siliceous or siliceous and aluminous materials which, in themselves, possess little or no cementitious value but which will, in finely divided form and in the presence of water, react chemically with calcium hydroxide at ordinary temperature to form compounds possessing cementitious properties.

Pozzolans encompass a large number of materials. Non-limiting examples of natural pozzolan include metakaolin, calcined shale, calcined clay, volcanic glass, zeolitic trass or tuffs, rice husk ash, Diatomaceous earth, and calcined shale. In a preferred embodiment, the natural pozzolan meets the standard specification ASTM C618.

In the concrete mix composition, in some embodiments, the content of the at least one hydraulic cement is 120-300 kg/m$^3$, 150-280 kg/m$^3$, 180-260 kg/m$^3$, or 200-250 kg/m$^3$; the content of the silica fume (SF) is 20-310 kg/m$^3$, 50-280 kg/m$^3$, 80-250 kg/m$^3$, 110-220 kg/m$^3$, or 140-190 kg/m$^3$; and the content of the natural pozzolan (NP) is 120-220 kg/m$^3$, 140-200 kg/m$^3$, or 160-180 kg/m$^3$, with the combined content of the hydraulic cement, the SF, and the NP at 400-550 kg/m$^3$, 400-500 kg/m$^3$, 405-480 kg/m$^3$, 430-470 kg/m$^3$, or 460 kg/m$^3$.

In one embodiment, the concrete mix composition further comprises aggregates, e.g. gravel and/or sand. Aggregates preferably make up about 60 to 80 percent of the total volume of the concrete mix composition, or 70-85% of the total weight of the concrete mix composition. The aggregates may be coarse aggregates, fine aggregates, or a mixture of coarse aggregates and fine aggregates. Coarse aggregate is usually greater than 4.75 mm (retained on a No. 4 sieve), e.g. 5-20 mm, 8-18 mm, 10-15 mm, or 12-14 mm, while fine aggregate is less than 4.75 mm (passing the No. 4 sieve), e.g. 0.1-4.5 mm, 0.2-4 mm, 0.5-3 mm, or 1-2 mm. In a preferred embodiment, the aggregates are at least one selected from the group consisting of fused aluminum oxide (FAO), calcined bauxite, and emery to make the resultant concrete from the concrete mix composition resistant to high temperatures. In another preferred embodiment, the aggregates comprise fused aluminum oxide (FAO) at 50-100%, 60-90%, or 70-80% of the total volume of the aggregates. FAO is a refractory material and has a linear coefficient of thermal expansion of $5.4 \times 10^{-6}$ m/m*° C., which is significantly less than siliceous sands (e.g., fine sand and quartz). At a temperature of 572.7° C., FAO expands 0.85% as described in American Society for Testing and Materials (ASTM) STP169C, entitled "Significance of Tests and Properties of Concrete and Concrete-Making Materials", incorporated herein by reference in its entirety. FAO expands and contracts considerably less in response to high temperatures than siliceous sands. Excessive expansion of the aggregate degrades the structural integrity of a concrete due to the development of high internal tensile stresses in the concrete. Therefore, the use of FAO as an aggregate provides a measure of heat resistance to a concrete in which it is carried compared with a concrete containing only siliceous sands.

To provide additional resistance to high temperatures and alkaline conditions, in a preferred embodiment, a surface of the resultant concrete from the concrete mix composition is coated with an epoxy resin or a mixture of epoxy resins. The epoxy resin coating is preferably a waterborne epoxy resin coating, more preferably a high performance waterborne epoxy resin coating for concrete disclosed in Chinese Patent No. CN104710899 A, incorporated herein by reference in its entirety. In other embodiments, the epoxy resin coating comprises at least one epoxy resin selected from the group consisting of bisphenol A, bisphenol F, epichlorohydrin, and tetraglycidyldiaminodiphenylmethane. In one embodiment, the epoxy resin coating may be applied on the surface of the concrete by mixing the epoxy resin with a curing agent and silica sand and then spreading the mixture over the concrete surface followed by press-forming plastering using a finisher. The resins used preferably have good flowability with an intermediate level of viscosity to be well mixed with silica sand and also provide easier press-forming plastering. In a preferred embodiment, the surface of the concrete is treated with a multifunctional primer adhesive before the mixture of epoxy resin, a curing agent, and silica sand is applied on the adhesive-treated concrete surface, as disclosed in International Application Publication No. WO2005063880 A1, incorporated herein by reference in its entirety. In some embodiments, the epoxy resin coating has a thickness of 0.1-1 mm, 02-0.8 mm, 0.3-0.6 mm, 1-10 mm, 2-8 mm, or 3-5 mm.

In another embodiment, the concrete mix composition may be mixed with one or more epoxy resins (and their curing agents or hardners if needed) to form a concrete with cured epoxy resin particles dispersed throughout the mass of the concrete. Such a concrete may possess improved tensile strength and chemical resistance. The amount of the epoxy resins or the total amount of the epoxy resins and their curing agents used in preparing the mixture for making the epoxy resin incorporated concrete may vary depending on the strength of the concrete desired and economic considerations. Generally, the amount of the epoxy resins or the epoxy resins plus the curing agents is 0.5-20%, 1-10%, 3-8%, or 4-6% of the total weight of the concrete mix composition, which may include the weight of aggregates when aggregates are included in the concrete mix composition.

Besides the epoxy resins described above, other suitable epoxy resins for making the epoxy resin incorporated concrete include a polyepoxide that possesses more than one vic-epoxy (oxirane) group per molecule and that may be saturated or unsaturated, aliphatic, cycloaliphatic, aromatic or heterocyclic, as disclosed in U.S. Pat. No. 3,477,979 A, incorporated herein by reference in its entirety, and diglycidyl ether of bisphenol A disclosed in U.S. Pat. No. 3,949,144 A, incorporated herein by reference in its entirety.

Any suitable and convenient manner and order to mix the materials of the concrete mix composition and the epoxy resins may be used generally. However, it is desirable and advantageous to prepare the epoxy resin or a mixture of the epoxy resin and the curing agent separately and then add it to the concrete mix composition. A mixture for making an epoxy resin incorporated concrete may be prepared as follows:

1. mix a suitable amount of the cementitious blend composition of the concrete mix composition with a suitable amount of one or more epoxy resins (and their curing agents if needed), and
2. add water to the mixture of the cementitious blend composition and the epoxy resins. Stir the resulting mixture to ensure that the resulting mixture is consistent throughout.

To provide impact resistance to the resultant concrete from the concrete mix composition, in a preferred embodiment, the concrete mix composition further comprises one or more reinforcing materials selected from the group consisting of steel rebar, wire mesh, steel fibers, polypropylene fibers, nylon fibers, and polyvinyl alcohol fibers. The reinforcing materials may provide impact resistance by increasing the flexural and tensile strength of the concrete formed from the concrete mix composition and thus increasing the amount of energy required to cause rupture and complete failure. Advantageously, the reinforcing materials provide strength when cracks form in the concrete, since the reinforcing materials bridge the void created by the crack and allow the concrete to deform in a ductile manner. In some embodiments, the total content of the reinforcing material is between 0.25% and 2% of the concrete mix composition by volume, preferably between 0.6% and 2% of the concrete mix composition by volume, and preferably 1% to 2% of the concrete mix composition by volume. When additional resistance to high temperatures is desired, polypropylene fibers and/or polyvinyl alcohol fibers may be used as the reinforcing material. When exposed to high temperatures, the polypropylene fibers and/or polyvinyl alcohol fibers melt and decompose, opening channels in the concrete. The channels allow water vapour (e.g., steam), which is generated from the decomposition of hydrated cements, to escape from the concrete, reducing and/or preventing the cracking and spalling of concrete due to generation of high internal tensile forces. There are various ways of making reinforced concrete. Reinforced concrete can be made by forming the concrete inside a metal or timber framework or by casting the concrete around ridged steel bars, or rebars (reinforcing bars). Another variation called stressed or prestressed concrete involves molding wet concrete around pretensioned steel wires. The wires compress the concrete as it sets, making it much harder. To make fiber-reinforced concrete mix, reinforcing fibers may be mixed with the cementitious blend composition, water, and optionally sand and aggregates.

In another preferred embodiment, the concrete mix composition further comprises at least one high range water reducer, also known as superplasticizer. One suitable type of high range water reducer may be a polycarboxylate superplasticizer, e.g. a viscosity-control type polycarboxylate superplasticizer as disclosed in Chinese Patent Application Publication No. CN103553413 A, an early-strength polycarboxylate superplasticizer as disclosed in Chinese Patent Application Publication No. CN103011669 A, and an ether polycarboxylate superplasticizer as disclosed in Chinese Patent Application Publication No. CN104261720 A. Each of the above mentioned Chinese patent application publications is incorporated herein by reference in its entirety. The polycarboxylate superplasticizer included in the concrete mix composition preferably meets ASTM C494 Type F and G requirements. Another suitable type of high range water reducer may be a naphthalene high range water reducer, particularly when the hydraulic cement in the concrete mix composition is a Portland cement, a calcium aluminate cement, or a mixture thereof. Non-limiting examples of suitable naphthalene high range water reducers include those disclosed in U.S. Pat. No. 4,460,720A, 5858083, and 4164426, and Chinese Patent Application Publication No. CN 102086105A, each of which is incorporated herein by reference in its entirety. Additionally, other types of superplasticizers may also be appropriate, such as a sulfonated copolymer of styrene and alpha-methylstyrene or a salt thereof disclosed in U.S. Pat. No. 4,746,367A, incorporated herein by reference in its entirety. A water reducer reduces the water content (e.g., the water/cementitious blend composition weight ratio), decreases the concrete porosity, increases the concrete strength as less water is required for the concrete to remain workable, increases the workability, reduces the water permeability (due to a reduction in connected porosity), and reduces the diffusivity of aggressive agents in the concrete and thereby improves the durability of the concrete. A high range water reducer is an admixture which has the ability to reduce the amount of water over a wide range, for example, 5 to 15% as per ASTM C494 while maintaining a certain level of consistency and workability, as compared with conventional water reducers with a narrower range of 5 to 8%. A typical dosage of high range water reducers used for increasing the workability of concrete ranges from 1 to 3 liters per cubic meter of concrete where liquid high range water reducers contain about 40% of active material. In reducing the water/cementitious blend composition weight ratio, a higher dosage may be used, e.g. from 5 to 20 liters per cubic meter of concrete. Dosage needed for a specific concrete may be unique and may be determined by the Marsh Cone Test.

In some embodiments, the hydraulic cement in the concrete mix composition is a Portland cement and, after the concrete mix composition is cured with water for at least 1 month, at least 2 months, or at least 3 months, the water cured product of the concrete mix composition has a compressive strength of 50-110 MPa, 55-100 MPa, or 60-90 MPa.

In some embodiments, the hydraulic cement in the concrete mix composition is a Portland cement and, after the concrete mix composition is cured with water for at least 1 month, at least 2 months, or at least 3 months, the water cured product of the concrete mix composition has a reduction in compressive strength of 2-15%, 4-10%, or 6-8% when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months as compared to the water cured product of the concrete mix composition exposed to water at 15-35° C., 20-30° C., or 25° C. for the same length of time.

In some embodiments, the hydraulic cement in the concrete mix composition is a Portland cement and, after the concrete mix composition is cured with water for at least 1 month, at least 2 months, or at least 3 months, the water cured product of the concrete mix composition has a weight loss of 0-6%, 0-4%, 0-2%, 0-1%, or 0-0.5% when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months as compared to the water cured product of the concrete mix composition exposed to water at 15-35° C., 20-30° C., or 25° C. for the same length of time.

In some embodiments, the hydraulic cement in the concrete mix composition is a Portland cement and, after the concrete mix composition is cured with water for at least 1 month, at least 2 months, or at least 3 months, the water cured product of the concrete mix composition has a chloride permeability of 500-2500, 900-2200, 1200-2000, or 1400-1800 Coulombs when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 8-20 months, 10-18 months, 12-16 months, or 13-15 months.

In some embodiments, the hydraulic cement in the concrete mix composition is a Portland cement and, after the concrete mix composition is cured with water for at least 1 month, at least 2 months, or at least 3 months, the water cured product of the concrete mix composition has an expansion of 200-850 microns, 250-800 microns, 300-740 microns, 350-700 microns, 400-650 microns, 450-600 microns, or 500-550 microns when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months.

The void content of a concrete significantly affects its strength. Cement content can be low if the void content is low and vice versa. In some embodiments, the resultant concretes from the embodiments of the concrete mix composition have a void content of less than 15% by volume, preferably less than 10% by volume, or more preferably less than 5% by volume.

Since the resultant concretes from all of the above mentioned embodiments of the concrete mix composition may be resistant to high temperatures and alkaline solutions, each of the above mentioned embodiments of the concrete mix composition, preferably the embodiments comprising a Portland cement, a calcium aluminate cement, at least one aggregate selected from FAO, calcined bauxite, and emery, at least one reinforcing material selected from polypropylene fibers and polyvinyl alcohol fibers, and/or a polycarboxylate superplasticizer, may be advantageously cast or molded in the form of an alumina digester tank in an aluminum smelter and the resultant cast or molded mass is cured with water to obtain the alumina digester tank made of concrete resistant to a high temperature of for example, 60-300° C., 80-300° C., 100-300° C., 100-250° C., 120-200° C., or 150-180° C., and a caustic soda (NaOH) solution at a concentration of, for example, 200-600 g/L, 300-500 g/L, or 320-450 g/L. As an example, to prepare the concrete mix composition for constructing the alumina digester tank according to one embodiment of the concrete mix composition, the aggregates may be mixed first, followed by addition of the hydraulic cement, part of sand if sand is included in the mix, and water containing a required amount of a high range water reducer. The final mixing stage involves the addition of natural pozzolan and silica fume, and the remaining sand if sand is included in the mix.

When in operation, an alumina digester tank is a high temperature and alkaline environment by the presence of a hot sodium hydroxide (caustic soda) solution. Aluminum production from bauxite ore is a three step process. First, the alumina is extracted from bauxite ore usually using the Bayer Process. In the Bayer Process, finely crushed bauxite is mixed with sodium hydroxide and placed in an alumina digester tank. High temperatures (e.g. 60-300° C., 80-300° C., 100-300° C., 100-250° C., 120-200° C., or 150-180° C.) and pressures (from atmospheric pressure for a gibbsitic bauxite to tens of bars for a diasporic bauxite) in the alumina digester tank cause reactions in the ore/sodium hydroxide mixture that last from 30 minutes to several hours. The result is dissolved aluminum oxide (i.e. sodium aluminate) and ore residues. The residues, which include silicon, lead, titanium, and calcium oxides, form a sludge in the bottom of the alumina digester tank. The aluminum oxide is evaporated off and condensed. Starches and other ingredients are added to remove any remaining impurities from the oxide. The solution is then moved to a precipitation tank where the aluminum oxide is crystallized. Aluminum hydroxide and sodium hydrizide are the products of the crystallization. The crystals are washed, vacuum dewatered and sent to a calcinator for further dewatering. Aluminum oxide from the Bayer Process is then reduced to aluminum metal usually using the Hall-Heroult process. In this process the aluminum oxide is placed in a electrolytic cell with molten cryolite. A carbon rod in the cell is charged and the reaction results in carbon monoxide, carbon dioxide and aluminum. The aluminum sinks to the bottom where it is removed from the tank and sent to a melting or holding furnace. The molten aluminum is then mixed with desired alloys to obtain specific characteristics and cast into ingots for transport to fabricating shops. In the fabrication shops, the molten aluminum or aluminum alloys are remelted and poured into casts and cooled. Molten aluminum may be further heated to remove oxides, impurities and other active metals such as sodium and magnesium, before casting. Chlorine may also be bubbled through the molten aluminum to further remove impurities.

In a preferred embodiment, the alumina digester tank constructed with the resultant concrete from the concrete mix composition is of a cylindrical or similar shape that has a height to diameter ratio of 1-5, 2-4, or 3-4. Preferably designed to function as a pressure cooker or vessel to dissolve alumina contained in bauxite in a caustic soda solution at a high temperature and pressure, the alumina digester tank comprises a top wall, a bottom wall, and side walls defining an enclosed space inside the alumina digester tank and is part of an alumina digester tank system operational in an aluminum production process described above. Besides the alumina digester tank, the alumina digester tank system comprises one or more inlets disposed on at least one of the top wall, the bottom wall, and the side walls of the alumina digester tank configured to introduce a mixture comprising bauxite and a caustic soda solution into the enclosed space of the alumina digester tank. In a preferred embodiment, the bauxite in the mixture has been ground to fine grains with a diameter of, for example, less than 500 µm, less than 400 µm, or less than 300 µm, to increase the contact surface between the caustic soda solution and the bauxite and to improve the yield of the digestion, i.e. the solubilization of alumina in the caustic soda solution. In one embodiment, the inlet is connected to a pump configured to pump the mixture or slurry of the fine grains of bauxite and the caustic soda solution into the enclosed space of the alumina digester tank via the inlet.

To increase the digestion efficiency, particularly to make the alumina contained in diasporic bauxite soluble, it may be necessary to apply a high pressure to the mixture. In a preferred embodiment, the alumina digester tank is configured to build and maintain a pressure of 1-100 bars, 5-90 bars, 10-80 bars, 20-70 bars, 30-60 bars, or 40-50 bars in the enclosed space, for example, by heating air or gas contained in the enclosed space and/or by pumping (hot) air or gas into the enclosed space. In a preferred embodiment, the alumina digester tank system comprises a pressure detector for detecting the pressure applied to the mixture in the enclosed space of the alumina digester tank.

To generate and maintain a high temperature for efficient alumina digestion in the enclosed space of the alumina digester tank holding the mixture of the bauxite and the caustic soda solution, the alumina digester tank system comprises one or more heaters, e.g. electrical or gas powered heaters, or heat exchangers connected to heat pumps, that may be installed on the interior of the top wall, the bottom wall, and/or the side walls and/or in the enclosed space of the alumina digester tank, for example, by disposing resistive heating elements or heat exchangers or circulating heated air in a network of pipes disposed in the enclosed space. In some embodiments, the heaters are configured to heat the mixture of the bauxite and the caustic soda solution to a temperature of 60-300° C., 80-300° C., 100-300° C., 100-250° C., 120-200° C., or 150-180° C. In a preferred embodiment, the alumina digester tank system comprises a temperature detector for detecting the temperature of the mixture in the enclosed space of the alumina digester tank. In another preferred embodiment, the alumina digester tank system comprises a control for operating the at least one heater. The control is configured to monitor the temperature of the mixture in the enclosed space of the alumina digester tank, either by communicating with the above mentioned temperature detector, or by including a temperature detector of its own, and to operate the at least one heater when the temperature of the mixture is below a pre-determined level. As an example, the control may be a set point thermostat.

The alumina digester tank system comprises one or more outlets disposed on the top wall, the bottom wall, and/or the side walls configured to release the mixture from the enclosed space of the alumina digester tank. During the digestion, in some instances, the alumina digester tank functions as a pressure cooker where the mixture is subjected to a high temperature and a high pressure. Following the digestion, the mixture may be preferably transferred to an environment of a lower temperature and pressure, i.e. a flash tank, before transferred to a settling tank where insoluble materials in the mixture, such as sand and iron, settle to the bottom of the settling tank. In a preferred embodiment, the outlet is connected to a series of "flash tanks" via a pipe. In another preferred embodiment, a second pump is connected to the outlet configured to pump the mixture out of the enclosed space of the alumina digester tank via the outlet and into a downstream processing unit, for example, a flash tank or a series of flash tanks.

In one embodiment, the alumina digester tank system comprises one or more agitators disposed on the interior of at least one of the top wall, the bottom wall, and the side walls and/or in the enclosed space of the alumina digester tank configured to agitate the mixture in the enclosed space. The operation of the agitator improves the contact between the bauxite and the caustic soda solution and hence the solubilization of alumina in the caustic soda solution. The agitator may be a mechanical mixer comprising a screw or blade turned by a motor, e.g. a blade paddle type impeller disclosed in PERFORMANCE IMPROVEMENT OF ALUMINA DIGESTORS, T. Kumaresan, S. S. Thakre, B. Basu, K. Kaple, H. P. Gupta, A. Bandi, P. Chaturvedi, N. N. Roy, S. N. Gararia, V. Sapra, R. P. Shah, Seventh International Conference on CFD in the Minerals and Process Industries, CSIRO, Melbourne, Australia, 9-11 Dec. 2009, incorporated herein by reference in its entirety, or may be a pressurized gas based agitator as disclosed by U.S. Pat. No. 8,147,117 B2, incorporated herein by reference in its entirety. One such pressurized gas-based agitator or mixer may be obtained from Pulsair (Bellevue, Wash., USA). In a preferred embodiment, a plurality of agitators are disposed throughout the entire volume of the mixture in the enclosed space of the alumina digester tank. For example, a number of mechanical mixers vertically spaced from one another may be installed on a vertical support beam which is disposed in the enclosed space of a vertical cylindrically-shaped alumina digester tank and which spans from the top to the bottom of the mixture.

In one embodiment, the alumina digester tank system comprises one or more baffles disposed on the interior of at least one of the top wall, the bottom wall, and the side walls and/or in the enclosed space of the alumina digester tank configured to achieve a desired flow pattern of the mixture in the enclosed space of the alumina digester tank. Depending on the desired flow pattern of the mixture, the baffles may be in any shape, e.g. a plate shape, a ring shape, a tubular shape, or a funnel shape, and may be placed in any orientation, e.g. horizontal or vertical. The baffles may change the flowing momentum of the mixture and thus affect dispersion level of the mixture, as disclosed in PERFORMANCE IMPROVEMENT OF ALUMINA DIGESTORS, T. Kumaresan, S. S. Thakre, B. Basu, K. Kaple, H. P. Gupta, A. Bandi, P. Chaturvedi, N. N. Roy, S. N. Gararia, V. Sapra, R. P. Shah, Seventh International Conference on CFD in the Minerals and Process Industries, CSIRO, Melbourne, Australia, 9-11 Dec. 2009, incorporated herein by reference in its entirety.

In a preferred embodiment, a surface of the interior of at least one of the top wall, the bottom wall, and the side walls of the alumina digester tank, particularly the surface of the interior contacting the mixture comprising bauxite and a caustic soda solution when the alumina digester tank is in operation, is coated with at least one epoxy resin, preferably using the types of the epoxy resins and the coating methods to achieve the desirable characteristics of the epoxy resin coating described above. In some embodiments, the epoxy resin coating covers 10-100%, 30-100%, 50-100%, preferably 70-100%, more preferably 90-100% of the interior wall surface, depending on the percentage of the interior wall surface that comes into contact with the mixture when the alumina digester tank is in operation.

According to a second aspect, the present disclosure relates to an alumina digester tank system that includes: (a) an alumina digester tank obtained from a casting or molding of a concrete mix composition in the form of the alumina digester tank and water curing the cast or molded concrete mix composition, wherein the alumina digester tank has a height to diameter ratio of 1-5, 2-4, or 3-4, and comprises a top wall, a bottom wall, and side walls defining an enclosed space, wherein the concrete mix composition comprises: a cementitious blend comprising at least one hydraulic cement and ground granulated blast furnace slags (GGBFS), wherein a weight percent ratio of at least one hydraulic cement:GGBFS in the cementitious blend lies in the range of (10-50):(50-90), (20-40):(60-80), or (25-35):(65-75) with the sum of the weight percentages of the at least one hydraulic cement and the GGBFS not exceeding 100%, and water, wherein a weight ratio of the water to the cementitious blend is 0.2-0.5, 0.3-0.4, or 0.35, and wherein the concrete mix composition has a content of the cementitious blend of 400-550 kg/m$^3$, 400-500 kg/m$^3$, 405-480 kg/m$^3$, 430-470 kg/m$^3$, or 460 kg/m$^3$, (b) at least one inlet disposed on at least one of the top wall, the bottom wall, and the side walls of the alumina digester tank configured to introduce a mixture comprising bauxite and a caustic soda solution into the enclosed space of the alumina digester tank, wherein the alumina digester tank is configured to pressurize the mixture in the enclosed space to 1-100 bars, (c) at least one heater disposed on the interior of at least one of the top wall, the bottom wall, and the side walls and/or in the enclosed space of the alumina digester tank configured to heat the mixture to a temperature of 60-300° C., 80-300° C., 100-300° C., 100-250° C., 120-200° C., or 150-180° C., (d) at least one outlet disposed on at least one of the top wall, the bottom wall, and the side walls of the alumina digester tank configured to release the mixture from the enclosed space of the alumina digester tank, (e) at least one agitator disposed on the interior of at least one of the top wall, the bottom wall, and the side walls and/or in the enclosed space of the alumina digester tank configured to agitate the mixture in the enclosed space, (f) a temperature detector for detecting the temperature of the mixture in the enclosed space of the alumina digester tank, (g) a pressure detector for detecting the pressure applied to the mixture in the enclosed space of the alumina digester tank, and (h) a control for operating the at least one heater, wherein the control is configured to monitor the temperature of the mixture in the enclosed space of the alumina digester tank and operate the at least one heater when the temperature of the mixture is below a pre-determined level.

Like the resultant concrete from the concrete mix composition in the first aspect of the present disclosure, the resultant concrete from the concrete mix composition of this aspect may advantageously exhibit high durability in a hot and alkaline environment by the presence of a hot caustic soda solution, as indicated by, for example, a higher compressive strength and a lower chloride permeability relative to a conventional concrete comprising ordinary Portland cement, silica fume, and fly ash but not GGBFS as shown in Examples.

In some embodiments, the cementitious blend in the concrete mix composition does not include silica fume (SF), or fly ash (FA), or natural pozzolan (NP), or any combinations of SF, FA, and NP.

In some embodiments, the alumina digester tank and/or the alumina digester tank system of this aspect have the same characteristics and features as those described in the first aspect of the present disclosure.

In a preferred embodiment, a surface of the interior of at least one of the top wall, the bottom wall, and the side walls of the alumina digester tank, particularly the surface of the interior contacting the mixture comprising bauxite and a caustic soda solution when the alumina digester tank is in operation, is coated with at least one epoxy resin, preferably using the types of the epoxy resins and the coating methods to achieve the desirable characteristics of the epoxy resin coating described in the first aspect of the disclosure. In some embodiments, the epoxy resin coating covers 10-100%, 30-100%, 50-100%, preferably 70-100%, more preferably 90-100% of the interior wall surface, depending on the percentage of the interior wall surface that comes into contact with the mixture when the alumina digester tank is in operation.

In another embodiment, one or more epoxy resins (and their curing agents if needed) are added to and mixed with the concrete mix composition and the resulting epoxy resin incorporated concrete mix composition is cast or molded in the form of the alumina digester tank. In some embodiments, the types of suitable epoxy resins, the amounts of the epoxy resins used, and the methods for preparing the epoxy resin incorporated concrete mix composition are the same as those described in the first aspect of the present disclosure. Following water curing of the cast or molded epoxy resin incorporated concrete mix composition, the resultant concrete comprises epoxy resin particles dispersed throughout the mass of the concrete and may possess improved tensile strength and chemical resistance.

In some embodiments, the at least one hydraulic cement is at least one selected from the group consisting of a Portland cement, a calcium aluminate cement, a white cement, a high-alumina cement, a magnesium silicate cement, a magnesium oxychloride cement, and an oil well cement.

In a preferred embodiment, the at least one hydraulic cement is a Portland cement. The Portland cement in the cementitious composition preferably meets ASTM C150 Type 1, II, I/II, III, IV or V requirements or equivalent standard specifications.

In another preferred embodiment, the at least one hydraulic cement is a Portland cement combined with one or more other cements selected from a calcium aluminate cement, a white cement, a high-alumina cement, a magnesium silicate cement, a magnesium oxychloride cement, and an oil well cement. When the at least one hydraulic cement is a combination of the above mentioned cements, the relative weight proportions of different types of cements may vary without limitation, depending on, for example, the desired content of the cementitious blend in the concrete mix composition, which is preferably within the ranges described above, the desired compressive strength of the resultant concrete from the concrete mix composition after a certain period of curing of the concrete mix composition with water, and a target high temperature of the alumina digester tank in operation that the resultant concrete is expected to withstand while remaining stable, e.g. without breaking or cracking, for a desirable period of time.

Ground-granulated blast-furnace slag (GGBFS) is obtained by quenching molten iron slag (a by-product of iron and steel-making) from a blast furnace in water or steam, to produce a glassy, granular product that is then dried and ground into a fine powder. The main components of blast furnace slag are CaO (30-50% or 35-45%), $SiO_2$ (28-38%, or 30-35%), $Al_2O_3$ (8-24%, 10-20%, or 12-16%), and MgO (1-18%, 5-15%, or 8-12%). In general, increasing the CaO content of the slag results in increased slag basicity and an increase in compressive strength. GGBFS reacts like Portland cement when in contact with water. But as the rate of reaction is slower, an activator is necessary. The calcium hydroxide released when Portland cement reacts with water serves to activate GGBFS, hence GGBFS is preferably combined with Portland cement.

When GGBFS is used in concrete, the resulting hardened cement paste has more, smaller gel pores and fewer larger capillary pores than is the case with concrete made with Ordinary Portland cement. This finer pore structure gives GGBFS concrete a much lower permeability, and makes an important contribution to the greater durability of this concrete.

In a preferred embodiment, the GGBFS meets the standard specification ASTM C989.

In a preferred embodiment, the GGBFS is ground to reach the same fineness as Portland cement in the cementitious blend to obtain a suitable reactivity.

In a preferred embodiment, The GGBFS has a MgO content of 10-18%, 12-16%, or 14%, and/or a $Al_2O_3$ content of 10-24%, 12-20%, or 14% to provide a maximal compressive strength.

In some embodiments, the concrete mix composition further comprises aggregates, reinforcing materials, and/or high range water reducers, with their respective types, characteristics, and amount ranges being the same as those described in the first aspect of the present disclosure.

In some embodiments, the at least one hydraulic cement in the concrete mix composition is a Portland cement and, after the concrete mix composition is cured with water for at least 1 month, at least 2 months, or at least 3 months, the water cured product of the concrete mix composition has a compressive strength of 55-120 MPa, 60-110 MPa, or 65-100 MPa.

In some embodiments, the at least one hydraulic cement in the concrete mix composition is a Portland cement and, after the concrete mix composition is cured with water for at least 1 month, at least 2 months, or at least 3 months, the water cured product of the concrete mix composition has a reduction in compressive strength of 2-15%, 3-10%, or 6-8% when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months as compared to the water cured product of the concrete mix composition exposed to water at 15-35° C., 20-30° C., or 25° C. for the same length of time.

In some embodiments, the at least one hydraulic cement in the concrete mix composition is a Portland cement and, after the concrete mix composition is cured with water for at least 1 month, at least 2 months, or at least 3 months, the water cured product of the concrete mix composition has a weight loss of 0-6%, 0-4%, 0-2%, 0-1%, or 0-0.8% when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months as compared to the water cured product of the concrete mix composition exposed to water at 15-35° C., 20-30° C., or 25° C. for the same length of time.

In some embodiments, the at least one hydraulic cement in the concrete mix composition is a Portland cement and, after the concrete mix composition is cured with water for at least 1 month, at least 2 months, or at least 3 months, the water cured product of the concrete mix composition has a chloride permeability of 1000-3000, 1500-2800, 1800-2600, or 2000-2500 Coulombs when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 8-20 months, 10-18 months, 12-16 months, or 13-15 months.

In some embodiments, the at least one hydraulic cement in the concrete mix composition is a Portland cement and, after the concrete mix composition is cured with water for at least 1 month, at least 2 months, or at least 3 months, the water cured product of the concrete mix composition has an expansion of 200-1200 microns, 250-1100 microns, 300-1000 microns, 400-900 microns, 500-800 microns, or 600-700 microns when exposed to an alkaline solution comprising 10-50%, 15-45%, 20-40%, or 25-35% of one or more alkali hydroxides (i.e. LiOH, NaOH, KOH, RbOH, and CsOH) at 40-80° C., 50-70° C., or 60° C. for 4-16 months, 6-14 months, 8-12 months, or 10 months.

In some embodiments, the resultant concretes from the embodiments of the concrete mix composition have a void content of less than 15% by volume, preferably less than 10% by volume, or more preferably less than 5% by volume.

Having generally described this invention, a further understanding can be obtained by reference to certain specific examples which are provided herein for purposes of illustration only and are not intended to be limiting unless otherwise specified.

Example 1

Concrete Mix Specimen Preparation

Concrete mix specimens were prepared with three types of cementitious material mixtures, namely, M1: Ordinary Portland cement (OPC)+silica fume (SF)+fly ash (FA); M3: Ordinary Portland cement (OPC)+ground granulated blast furnace slag (GGBFS); and M4: Ordinary Portland cement (OPC)+silica fume (SF)+natural pozzolan (NP). The natural pozzolan used comprised the powdered form of volcanic rock abundantly available on Red Sea coast in the Western region of Saudi Arabia. The properties of this natural pozzolan are similar to those of NP available in the many other parts of the world. An additional concrete mix specimen M2 was prepared with Ordinary Portland cement (OPC) and the specimen was coated twice with an epoxy resin to form two epoxy resin coatings, with each epoxy resin coating having a thickness of 200 microns. All of the concrete mix specimens were prepared with a combined cementitious materials content of 460 kg/m$^3$ and a water to cementitious materials ratio in the range of 0.305 to 0.35. Table 1 shows the contents of the cementitious materials in the four concrete mix specimens.

TABLE 1

Details of concrete mix specimens prepared for exposure to water and caustic soda solution.

| Mix # | Mix constituents | w/cm | OPC kg/m$^3$ | SF kg/m$^3$ | FA kg/m$^3$ | GGBFS kg/m$^3$ | NP kg/m$^3$ | Remarks |
|---|---|---|---|---|---|---|---|---|
| M1 (Currently Used) | OPC + SF + FA | 0.305 | 255 | 45 | 160 | — | — | Cast on site |
| M2 | OPC + epoxy coating | 0.35 | 460 | — | — | — | — | Epoxy coated. |
| M3 | OPC + GGBFS | 0.35 | 138 | — | — | 322 | — | Developed in the Lab |
| M4 | OPC + SF + NP | 0.35 | 255 | 45 | — | — | 160 | Developed in the Lab |

Notation:
OPC: Ordinary Portland cement;
SF: Silica fume;
FA: Fly ash;
GGBFS: Ground granulated blast furnace slag;
NP: Natural pozzolan;
w/cm: water to cementitious materials ratio.

Example 2

Exposure of the Concrete Mix Specimens to Water and a Caustic Soda Solution

After three months of curing, the specimens were divided into two groups. One group was exposed to water under a controlled temperature of 23±2° C. while the second group of the specimens was exposed to a caustic soda solution containing 320 g/L of NaOH and maintained at 60° C.

Example 3

Evaluation of the Concrete Mix Specimens Following the Exposure to Water and the Caustic Soda Solution The performance of the four concrete mix specimens exposed to the caustic soda solution was evaluated by visual examination, and by determining the compressive strength, expansion, resistance to chloride ion penetration and weight loss. The test details, specimen geometry, and test duration are provided in Table 2.

TABLE 2

Details of the geometry of the concrete mix specimens, tests and test durations

| Test description/ standard | Specimen geometry | Test duration |
| --- | --- | --- |
| Visual examination Compressive strength (ASTM C39) | Cylinder with a diameter of 75 mm and a height of 150 mm | After 4, 8, 12 and 16 months of exposure. |
| Length change/ Expansion (ASTM C157) | 40 × 40 × 160 mm prism | Periodic measurement up to 16 months of exposure. |
| Resistance to chloride ion penetration (ASTM C1202) | Cylinder with a diameter of 75 mm and a height of 150 mm | Before exposure and after completion of exposure for 12 and 16 months. |
| Pulse velocity (ASTM C597) | Cylinder with a diameter of 75 mm and a height of 150 mm | After 4, 8, 12 and 16 months of exposure. |

1. Visual Observations:

The condition of the concrete mix specimens exposed to water and the caustic soda solution for 16 months is shown in FIGS. 1A-4B. Maximum deterioration was noted in the specimens prepared with OPC+SF+FA (i.e. M1, reference concrete mix specimen). The two concrete mix specimens M3 and M4 developed in this disclosure did not exhibit any deterioration. Minor debonding of the epoxy resin coating was noted on the epoxy resin coated specimens M2.

Figure 5:
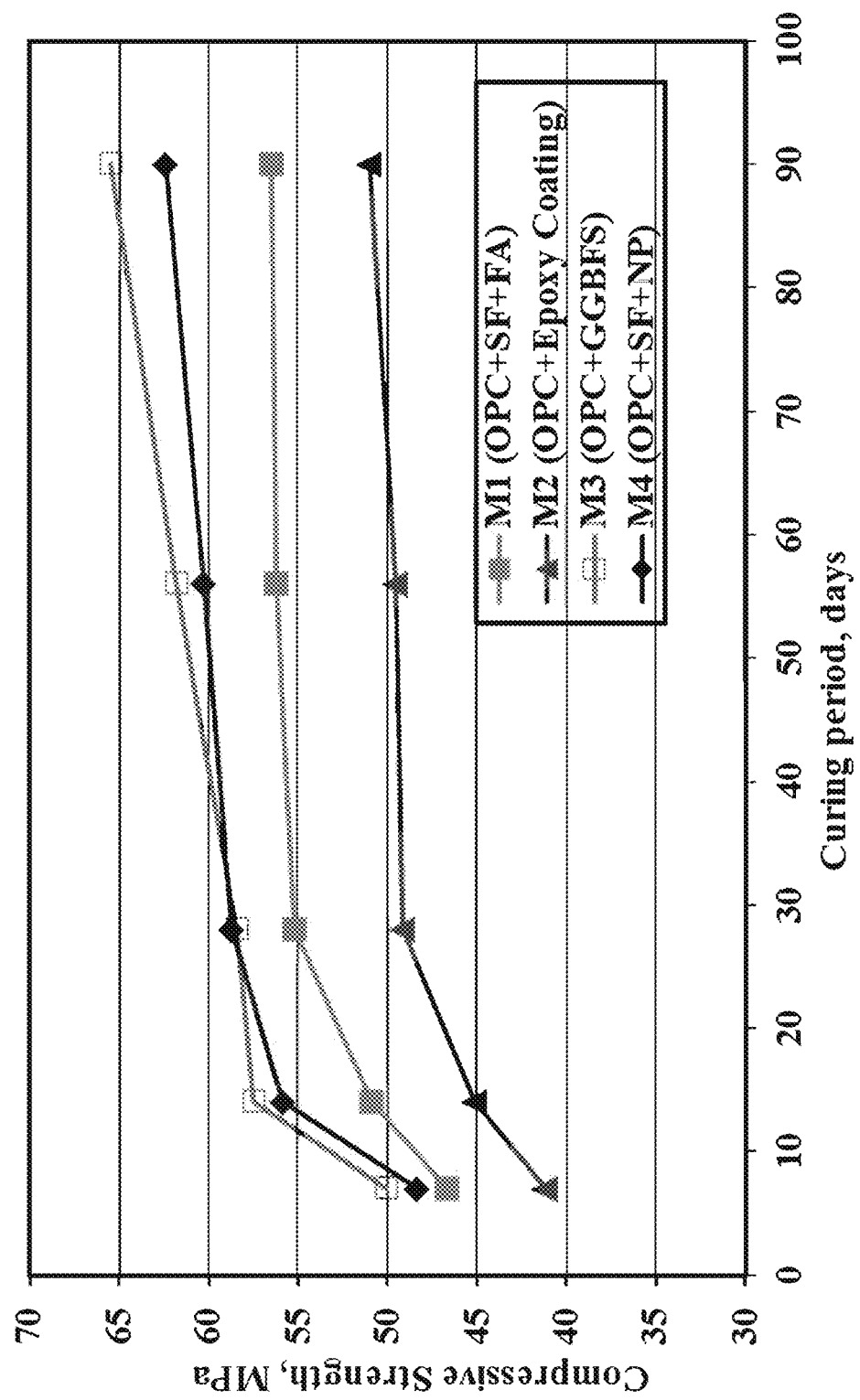
FIG. 5 is a graphical presentation of compressive strength of concrete mix specimens M1-M4 with increasing curing time in water up to three months according to Example 3.

2. Compressive Strength:

The development of compressive strength in the four concrete mix specimens cured under water for three months is depicted in FIG. 5. The compressive strength increased with time in all of the concrete mix specimens. After three months of curing, the concrete mix specimen M3 (OPC+GGBFS) exhibited the highest compressive strength of more than 65 MPa, while the concrete mix specimen M2 (OPC coated with an epoxy resin) exhibited the lowest compressive strength of 52 MPa. The compressive strength of the concrete mix specimens M3 and M4 was more than that of M2 and the reference concrete mix specimen M1.

Figure 6:
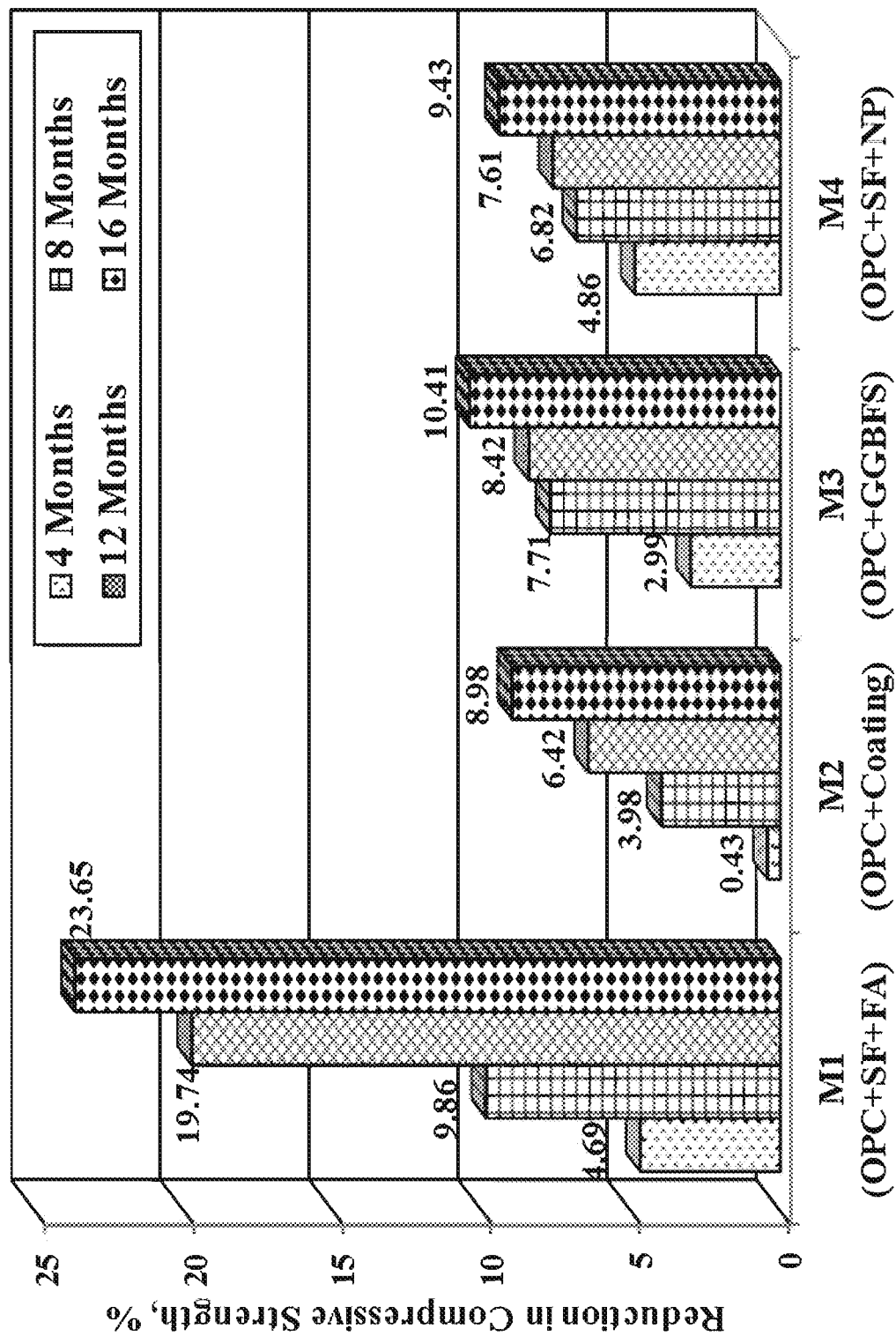
FIG. 6 is a graphical presentation of reduction in compressive strength of concrete mix specimens M1-M4 following an exposure to a caustic soda solution (320 g/L NaOH) at 60° C. for 4, 8, 12, or 16 months as compared to concrete mix specimens M1-M4 exposed to water at 23±2° C. for the same length of time according to Example 3.

The reduction in the compressive strength due to exposure to the caustic soda solution is depicted in FIG. 6. The maximum reduction of about 25% in compressive strength was noted in concrete mix specimen M1 (reference concrete mix specimen) after 16 months of exposure to the caustic soda solution. By contrast, the reduction in compressive strength in the other three concrete mix specimens was around 10% after 16 months of exposure to the caustic soda solution.

Figure 7:
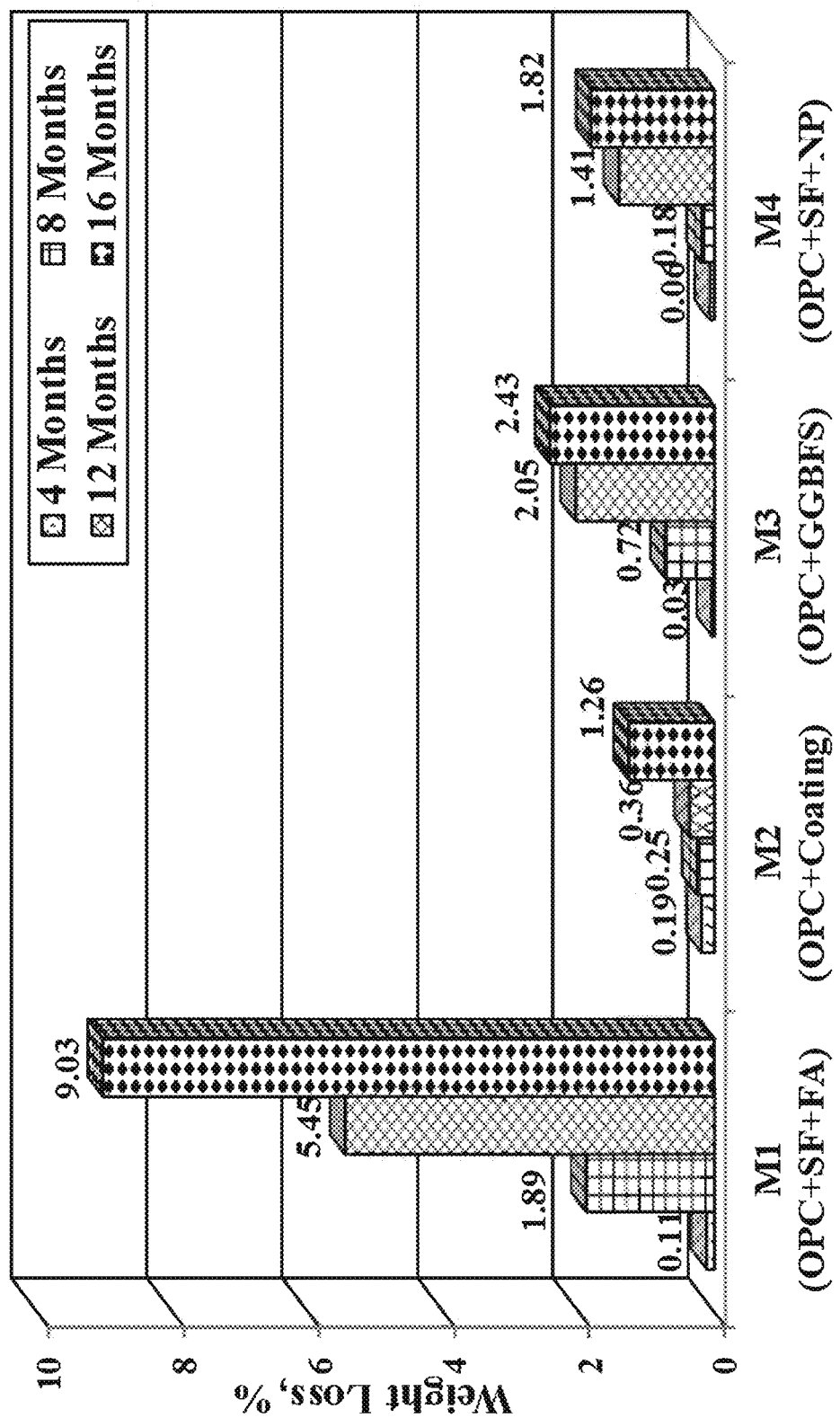
FIG. 7 is a graphical presentation of weight loss of concrete mix specimens M1-M4 following an exposure to a caustic soda solution (320 g/L NaOH) at 60° C. for 4, 8, 12, or 16 months as compared to concrete mix specimens M1-M4 exposed to water at 23±2° C. for the same length of time according to Example 3.

3. Weight Loss:

The weight loss in the concrete mix specimens exposed to the caustic soda solution maintained at a high temperature of 60° C. is depicted in FIG. 7. The maximum weight loss of 9.03% was noted in concrete mix specimen M1 (reference concrete mix specimen) following a 16-month exposure. The weight loss in the other three concrete mix specimens was in the range of 1.26-2.43% following a 16-month exposure.

Figure 8:
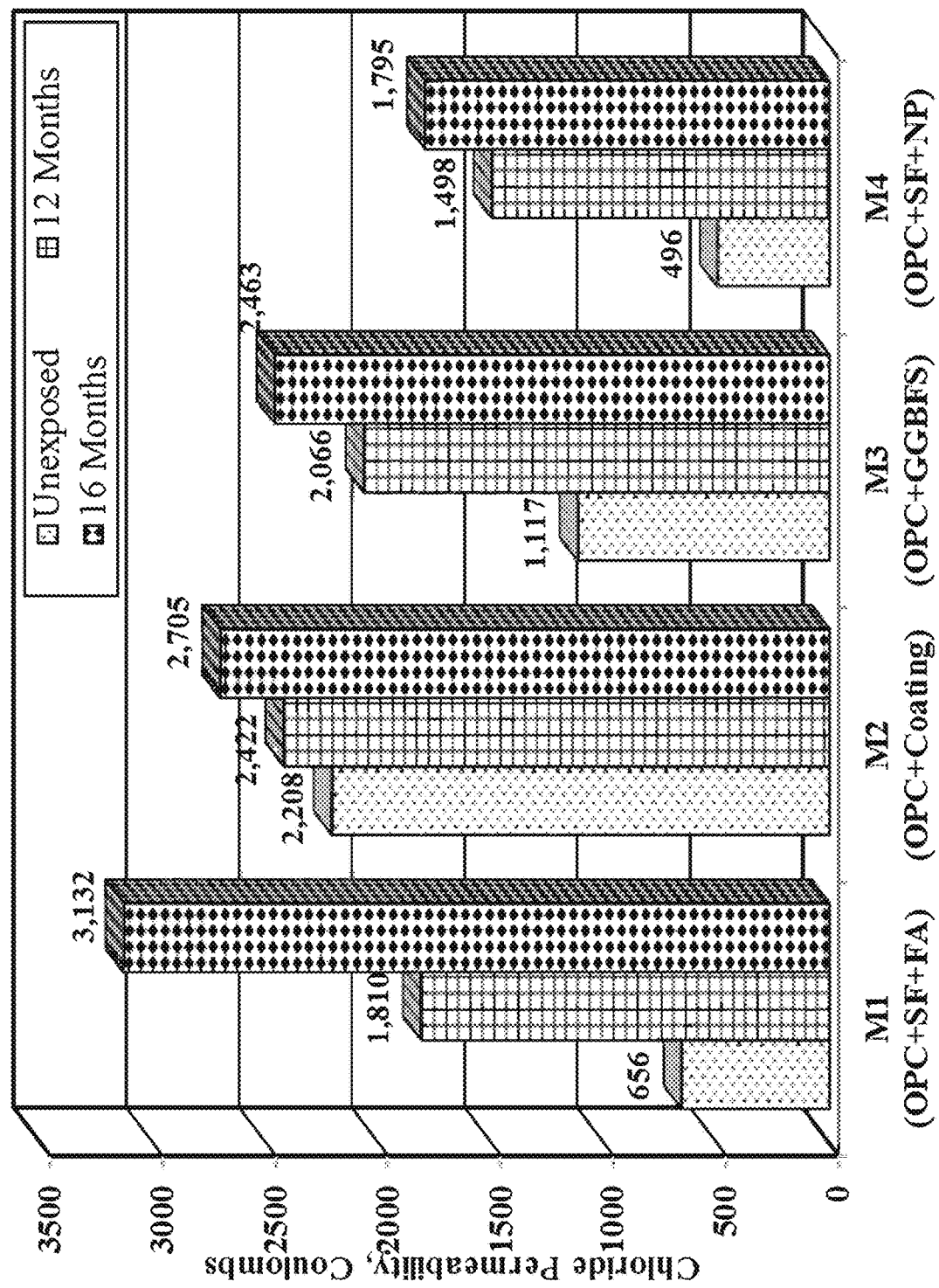
FIG. 8 is a graphical presentation of chloride permeability in concrete mix specimens M1-M4 unexposed or exposed to a caustic soda solution (320 g/L NaOH) at 60° C. for 12 or 16 months according to Example 3.

4. Chloride Permeability:

The chloride permeability in the concrete mix specimens exposed to the caustic soda solution is depicted in FIG. 8. The chloride permeability increased with the time of exposure to the caustic soda solution in all of the concrete mix specimens. The increase in the chloride permeability is indicative of a loss in the durability of the concrete mix specimens. The chloride permeability in concrete mix specimen M1 (reference concrete mix specimen) was more than that in the other three concrete mix specimens following a 16-month exposure. While the chloride permeability in concrete mix specimen M1 exposed to the caustic soda solution for 16 months was 3,132 Coulombs, it was in the range of 1,795-2,705 Coulombs in the other three concrete mix specimens after 16 months of exposure to the caustic soda solution.

Figure 9:
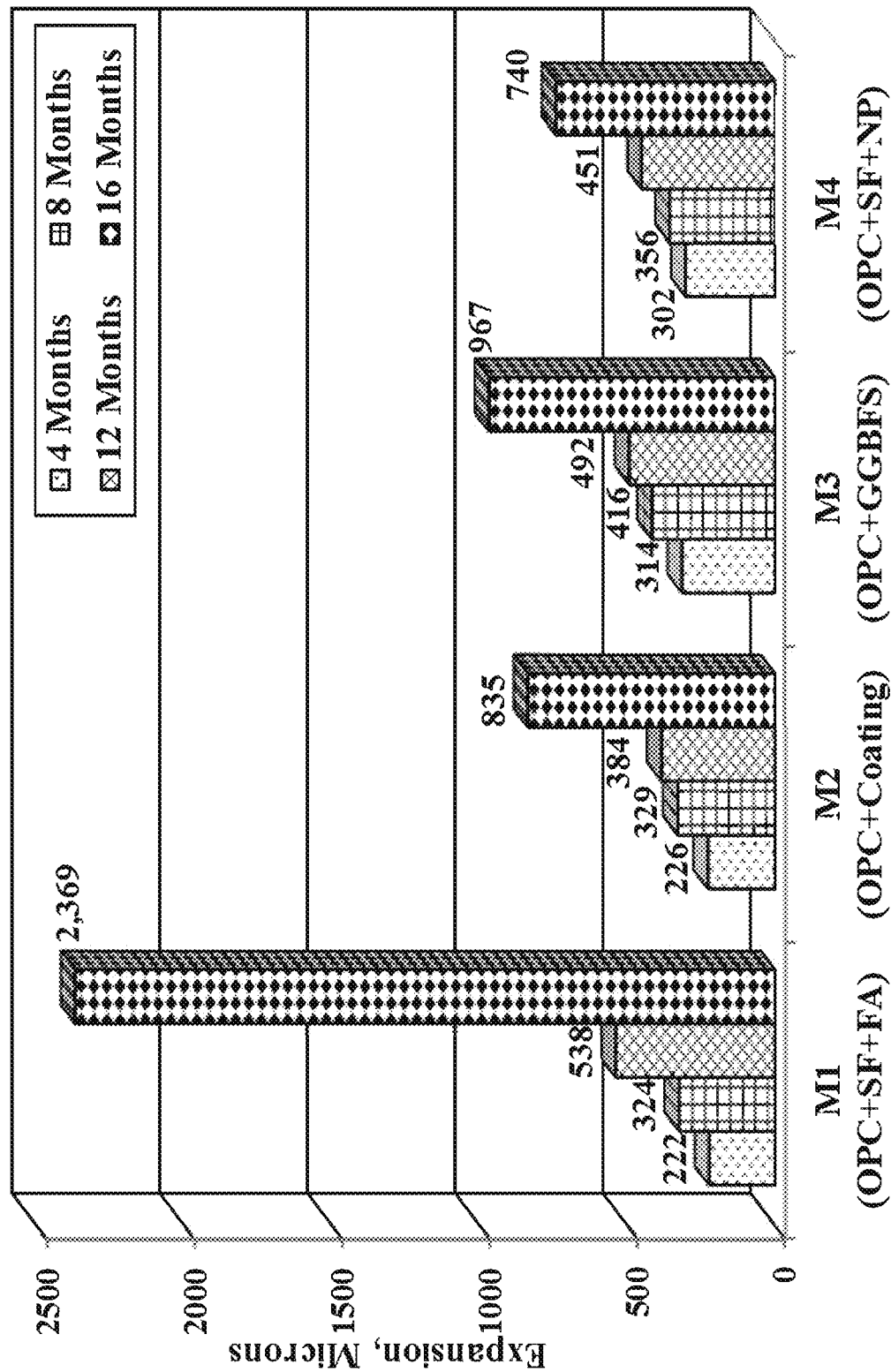
FIG. 9 is a graphical presentation of expansion in concrete mix specimens M1-M4 following an exposure to a caustic soda solution (320 g/L NaOH) at 60° C. for 4, 8, 12, or 16 months according to Example 3.

5. Expansion:

The expansion of concrete mix specimens M1-M4 following the exposure to the caustic soda solution for various periods of time is depicted in FIG. 9. As expected, the expansion increased with time in all of the concrete mix specimens M1-M4. After 16 months of exposure to the caustic soda solution, concrete mix M1 displayed an expansion of 2,369 microns while concrete mixes M2, M3, and M4 had an expansion of 835, 967, and 740 microns, respectively.

The invention claimed is:

1. A water cured product of a concrete mix composition, consisting of:
    a hydrated cementitious blend composition consisting of Portland cement, silica fume (SF), and natural pozzolan (NP), wherein the Portland cement, the silica fume, and the natural pozzolan are present in amounts of 255 kg/m$^3$, 45 kg/m$^3$ and 160 kg/m$^3$, respectively, based on a total weight of the cementitious blend composition being 460 kg/m$^3$, and
    at least one of a solid reinforcing material and an aggregate,
    wherein the water cured product is obtained by hydrating the concrete mix composition at a weight ratio of water to the cementitious blend composition of 0.35, and
    wherein the water cured product has a compressive strength of 60-90 MPa.

2. The water cured product of the concrete mix composition of claim 1, wherein the water cured product has a reduction in compressive strength of 2-15% when exposed to an alkaline solution comprising 10-50% of one or more alkali hydroxides at 40-80° C. for 4-16 months as compared to the water cured product exposed to water at 15-35° C. for the same length of time.

3. The water cured product of the concrete mix composition of claim 1, wherein the water cured product has a weight loss of 0-6% when exposed to an alkaline solution comprising 10-50% of one or more alkali hydroxides at 40-80° C. for 4-16 months as compared to the water cured product exposed to water at 15-35° C. for the same length of time.

4. The water cured product of the concrete mix composition of claim 1, wherein the water cured product has a chloride permeability of 1200-2000 Coulombs when exposed to an alkaline solution comprising 10-50% of one or more alkali hydroxides at 40-80° C. for 12-16 months.

5. The water cured product of the concrete mix composition of claim 1, wherein the water cured product has an expansion of 200-850 microns when exposed to an alkaline solution comprising 10-50% of one or more alkali hydroxides at 40-80° C. for 4-16 months.

6. The water cured product of the concrete mix composition of claim 1, wherein a 40×40×160 mm prism specimen expands 740 microns after immersion in a caustic soda solution for 16 months as determined according to ASTM C157.

7. The water cured product of the concrete mix composition of claim 1, wherein a cylinder specimen having a diameter of 75 mm and a height of 150 mm has a chloride permeability of 1,795 to 2,705 Coulombs after 16 months of exposure to a caustic soda solution according to ASTM C1202.

* * * * *